(12) United States Patent
Dunbridge et al.

(10) Patent No.: US 7,443,288 B2
(45) Date of Patent: Oct. 28, 2008

(54) TIRE AND SUSPENSION WARNING AND MONITORING SYSTEM

(75) Inventors: Barry Dunbridge, Torrance, CA (US); Kenneth L. Brown, Manhattan Beach, CA (US); George W. McIver, Redondo Beach, CA (US); Kiran R. Magiawala, Hawthorne, CA (US); Kelley D. Chilcott, Redondo Beach, CA (US)

(73) Assignee: TRW Automotive U.S. LLC, Livonia, MI (US)

( * ) Notice: Subject to any disclaimer, the term of this patent is extended or adjusted under 35 U.S.C. 154(b) by 331 days.

(21) Appl. No.: 10/854,351

(22) Filed: May 26, 2004

(65) Prior Publication Data
US 2004/0217853 A1 Nov. 4, 2004

Related U.S. Application Data

(62) Division of application No. 09/900,324, filed on Jul. 6, 2001, now Pat. No. 6,759,952.

(51) Int. Cl.
*B60C 23/00* (2006.01)
(52) U.S. Cl. .................. 340/444; 340/438; 340/440; 340/441
(58) Field of Classification Search ......... 340/438–444; 701/29, 70
See application file for complete search history.

(56) References Cited

U.S. PATENT DOCUMENTS

| | | | | |
|---|---|---|---|---|
| 3,833,094 A * | 9/1974 | Grossman | ............... | 188/1.11 R |
| 4,034,596 A * | 7/1977 | Cargile | ............... | 73/11.07 |
| 4,038,634 A * | 7/1977 | Caliri | ............... | 340/459 |
| 4,246,567 A | 1/1981 | Miller | ............... | 340/443 |
| 4,297,876 A | 11/1981 | Weiss | ............... | 73/146 |
| 4,327,579 A | 5/1982 | Weiss | ............... | 73/146 |
| 4,337,660 A | 7/1982 | Weiss | ............... | 73/600 |
| 4,458,234 A * | 7/1984 | Brisard | ............... | 340/438 |
| 4,458,535 A * | 7/1984 | Juergens | ............... | 73/651 |
| 4,550,286 A * | 10/1985 | Holland et al. | ............... | 324/503 |
| 4,570,152 A | 2/1986 | Melton et al. | ............... | 340/449 |
| 4,770,438 A * | 9/1988 | Sugasawa et al. | ......... | 280/5.518 |
| 4,949,989 A * | 8/1990 | Kakizaki et al. | ......... | 280/5.519 |
| 5,008,826 A | 4/1991 | Staudinger et al. | ......... | 701/124 |
| 5,259,246 A | 11/1993 | Stuyts | ............... | 73/669 |
| 5,269,186 A | 12/1993 | Yopp | ............... | 701/29 |
| 5,322,318 A * | 6/1994 | Kimura et al. | ............. | 280/5.51 |
| 5,430,646 A * | 7/1995 | Kimura et al. | ............. | 701/37 |

(Continued)

*Primary Examiner*—George A Bugg
*Assistant Examiner*—Son M Tang
(74) *Attorney, Agent, or Firm*—Tarolli, Sundheim, Covell & Tummino LLP

(57) ABSTRACT

A tire and suspension monitoring and warning system consisting of a set of multi-function sensors that monitor and warn of a failure mode. The system monitors and warns for tire imbalance, tire tread wear, and shock absorbers for a tire attached to a vehicle. The monitoring and warning system includes one axial, radial, and lateral acceleration measurement of the wheel to provide acceleration signal sample power. For tire imbalance, signal sample power in the second harmonic of the tire rotational frequency is compared to that of the first harmonic. For tire tread wear, average signal sample power within a second frequency range is compared to a previously stored baseline value. For shock absorber performance, a sum of all frequency components in a second predetermined frequency range is compared to a baseline value.

21 Claims, 4 Drawing Sheets

U.S. PATENT DOCUMENTS

| | | | |
|---|---|---|---|
| 5,525,960 A * | 6/1996 | McCall et al. | 340/438 |
| 5,526,262 A * | 6/1996 | Kimura et al. | 701/38 |
| 5,553,491 A * | 9/1996 | Naito et al. | 73/146.5 |
| 5,555,173 A * | 9/1996 | Campbell et al. | 701/37 |
| 5,555,500 A * | 9/1996 | Ogawa et al. | 701/36 |
| 5,596,141 A | 1/1997 | Nishikawa et al. | 73/146.2 |
| 5,721,528 A | 2/1998 | Boesch et al. | 340/442 |
| 5,754,102 A | 5/1998 | Yanase | 340/442 |
| 5,756,877 A * | 5/1998 | Nozaki | 73/11.09 |
| 5,826,207 A * | 10/1998 | Ohashi et al. | 701/36 |
| 5,948,976 A | 9/1999 | Newman | 73/146 |
| 5,959,365 A * | 9/1999 | Mantini et al. | 307/10.1 |
| 6,028,508 A | 2/2000 | Mason | 340/443 |
| 6,088,101 A | 7/2000 | Newman | 356/520 |
| 6,089,085 A | 7/2000 | Newman | 73/146 |
| 6,175,787 B1 | 1/2001 | Breed | 701/29 |
| 6,266,586 B1 | 7/2001 | Gagnon | 701/29 |
| 6,278,361 B1 | 8/2001 | Magiawala et al. | 340/438 |
| 6,347,547 B1 | 2/2002 | Moriguchi et al. | 73/146 |
| 6,386,031 B2 | 5/2002 | Colarelli, III et al. | 73/462 |
| 6,435,027 B1 | 8/2002 | Colarelli, III et al. | 73/462 |
| 2004/0102880 A1 * | 5/2004 | Brown | 701/29 |

* cited by examiner

TIRE AND SUSPENSION WARNING AND MONITORING SYSTEM

CROSS-REFERENCE TO RELATED APPLICATIONS

The present invention is a divisional of U.S. patent application Ser. No. 09/900,324, filed Jul. 6, 2001 now U.S. Pat. No. 6,759,952 which is related to U.S. patent application Ser. No. 09/454,443, filed in the U.S. Patent and Trademark Office on Dec. 3, 1999 (now U.S. Pat. No. 6,278,361).

BACKGROUND OF THE INVENTION

The present invention relates to a tire and suspension warning and monitoring system that is composed of a set of sensors. These sensors monitor and measure current tire and suspension performance and periodically warn the driver when the tires or the suspension system needs servicing. There is one sensor for each tire on the vehicle. Each sensor measures the following tire and suspension performance (a) tire imbalance of each tire of a vehicle, (b) tire tread wear of each tire of a vehicle, and (c) shock absorber performance for each tire of a vehicle.

The handling performance of a motor vehicle, e.g., vehicle steering and braking, as well as fuel consumption, is affected by the condition of the tires and the suspension. Handling performance can be affected by improper tire inflation, abnormal tire tread wear, out of balance conditions, as well as by poorly performing shock absorbers.

It is estimated that ten percent of tires that would normally wear out at 40,000 miles actually wear out at 30,000 miles due to abnormal tire tread wear. As a result, over the course of vehicle life of 120,000 miles, the vehicle would need an additional set of tires, at an average cost of $300. Thus, it is desirable to alert the driver of abnormal tire imbalance.

A tire monitoring system currently available from SmarTire Systems, Inc. uses wireless technology to monitor the air pressure and temperature in vehicle tires using wireless wheel-mounted sensors and a display receiver mounted within sight and reach of the driver. One sensor is mounted on each wheel and the tire mounted over the sensor, each sensor containing a pressure transducer, a temperature transducer, a centrifugal switch, a radio transmitter and a lithium battery. The display module shows required pressure, actual pressure, pressure status and temperature. While this system provides temperature and pressure information, it does not provide information about tread wear, balance and shock absorber performance.

In addition, anti-lock braking systems (ABS) and integrated vehicle controllers (IVC) require the input of information indicating the wheel rotational speed for each wheel. Currently, a separate wheel speed sensor is provided for each wheel. It typically consists of a toothed wheel made of a magnetic disk attached co-axially to a corresponding axle rotatably supporting a tire and a pick-up coil arranged adjacent each toothed wheel with an interval therebetween to provide an alternating sensor signal having a frequency indicative of speed of each tire. It would be desirable to eliminate the need for this type of sensor by using a sensor, which also provides additional functions.

Co-pending U.S. patent application Ser. No. 09/454,443, discloses a system and method for monitoring vehicle conditions affecting tires including tire tread wear, shock absorber performance, balance condition of the vehicle tire, and rotational speed of a vehicle wheel.

While the above-noted co-pending application includes many features in common with those of the present invention, it does not include salient features of the present invention including informing a driver of the vehicle when various vehicle components will fail and informing the driver as to how much time until a component failure.

SUMMARY OF THE INVENTION

The present invention relates to tire and suspension monitoring and warning system for (a) tire imbalance on a tire of a vehicle, (b) tire tread wear on a tire of a vehicle, and (c) shock absorber performance of a vehicle. Here, a change in match-filtered vibration signal from a single or multiple vibration sensors from its baseline value is used to determine the condition of a vehicle parameter of interest.

According to the present invention, a sensor measures the tire imbalance by sensing at least one acceleration of a tire, such as the radial acceleration of the tire, to provide acceleration signals. The signals are provided to at least one processor which processes the signals. A single processor or multiple processors can be used. The sensor and at least one processor can be mounted on the wheel, e.g., on the rim either inside the tire at the wheel well or near the valve stem or outside the tire in a protective casing. The at least one processor is responsive to acceleration signals from the sensor and processes these signals and determines the tire imbalance on the basis of a comparison of the processed signals with a previously stored threshold value, and provides an information signal indicative of tire imbalance which is transmitted to a driver information display. The signal can be either an alarm signal or a quantitative indication of tread imbalance.

According to the present invention, at least one acceleration of the wheel is sensed before computing tire imbalance. A predetermined number of acceleration signal samples are collected and then transformed and normalized. The rotational frequency of the wheel is then computed from the transformed and normalized samples and the second harmonic of the rotational frequency is then computed. All of the frequency components are then summed around the computed second harmonic frequency including a predetermined standard deviation on either side of the computed second harmonic frequency. The results may then be weighted by a power of the fundamental rotational frequency. The result may then also be low pass filtered to eliminate higher order frequencies including spurious noise. The filtered result is then compared with a predetermined threshold value. A signal is then outputted which is indicative of the comparison result.

According to the present invention, a sensor measures the tire tread wear by sensing at least one acceleration of a tire, such as the axial acceleration of the tire, to provide acceleration signals. The signals are provided to at least one processor which processes the signals. A single processor or multiple processors can be used. The sensor and at least one processor can be mounted on the wheel, e.g., on the rim either inside the tire at the wheel well or near the valve stem or outside the tire in a protective casing. At least one processor is responsive to acceleration signals from the sensor and processes these signals and determines the tire tread wear on the basis of a comparison of the processed signals with a previously stored baseline value, and provides an information signal indicative of tire tread wear which is transmitted to a driver information display. The signal can be either an alarm signal or a quantitative indication of tread wear.

According to the present invention, at least one acceleration of the wheel is sensed before computing tire tread wear.

A predetermined number of acceleration signal samples are collected and then transformed and normalized within a first predetermined frequency range. The transformed and normalized samples are then averaged within a second predetermined frequency range around the lateral resonance frequency of a tire shell, and the equivalent or average frequency from within in that second range is then compared with a previously stored baseline value for an unworn tire. A signal indicative of shift in equivalent or average frequency in a second predetermined range is then outputted, which is indicative of the comparison result for a worn tire.

According to one aspect of the invention, a technique for monitoring the shock absorber performance of a shock absorber attached to a vehicle wheel is provided. The technique uses a sensor which senses at least one acceleration of a tire, such as the radial acceleration of the tire, to provide acceleration signals. The signals are provided to at least one processor which processes the signals. A single processor or multiple processors can be used. The sensor and the at least one processor can be mounted on the wheel, e.g., on the rim either inside the tire (at the wheel well or near the valve stem) or outside the tire in a protective casing. The at least one processor is responsive to acceleration signals from the sensor and collects a predetermined number of acceleration samples. The samples are then used by the at least one processor to calculate a Discrete Fourier Transform (DFT) of the acceleration signals, e.g., by taking a Fast Fourier Transform (FFT) of the acceleration signals. All of the measured frequency components in a predetermined frequency range are then normalized by the at least one processor to the total energy contain in the FFT. A sum of all the frequency components is generated in another predetermined frequency range around the unsprung mass resonance frequency of a vehicle by the at least one processor and then subsequently low pass filtered. The result is then compared to a baseline result of a new shock absorber and the result of this comparison provides information indicative of shock absorber performance. This information indicative of shock absorber performance may then be transmitted to a driver information display.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE INVENTION

Figure 1:
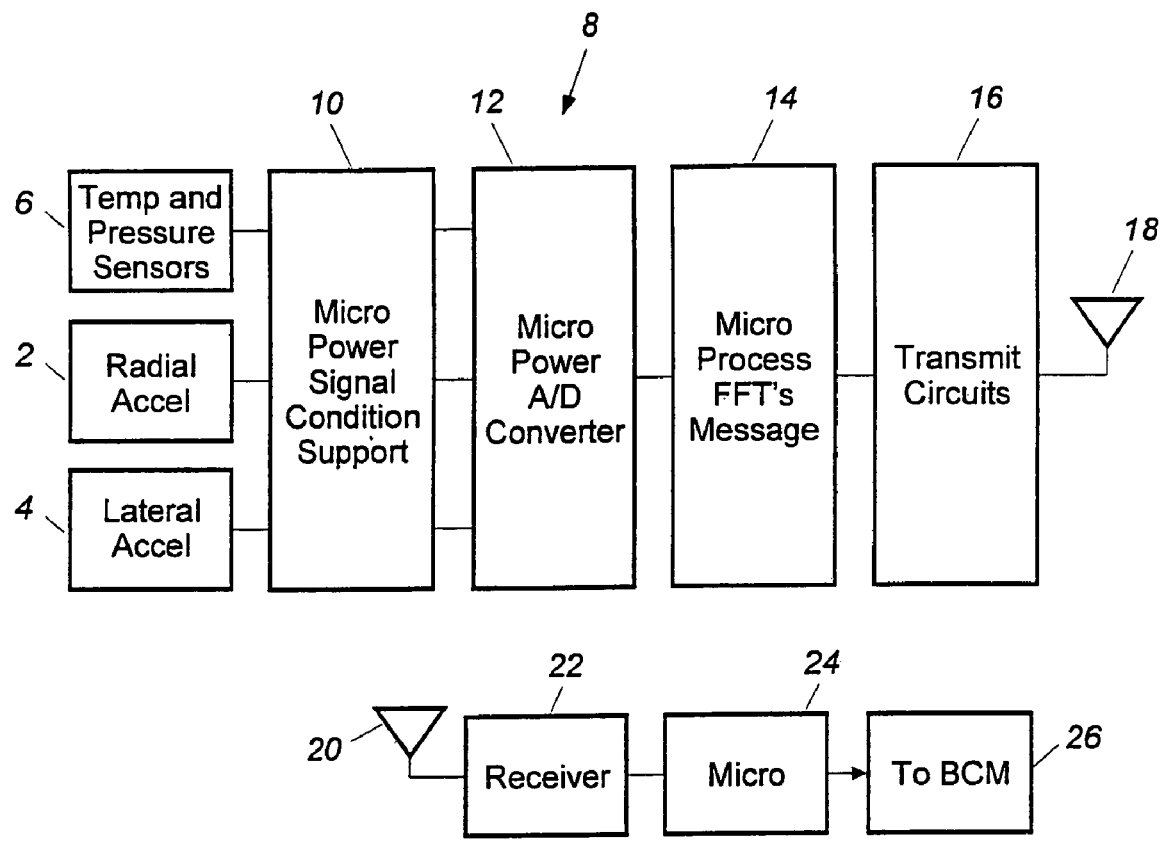
FIG. 1 is a block diagram of an example system capable of operating in accordance with the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. As a final note, well-known power connections and other well-known elements have not been shown within the drawing figures for simplicity of illustration and discussion and so as not to obscure the invention.

FIG. 1 is a block diagram of an example system capable of operating in accordance with the present invention. As shown in FIG. 1, one or more sensors are provided for sensing conditions at the vehicle wheel, either inside the tire or outside the tire on the wheel rim. At least one accelerometer 2 is provided for measuring an acceleration of the tire or wheel. Another accelerometer 4 may also be provided for measuring another acceleration of the wheel or tire. Radial acceleration is the acceleration of the wheel or tire in a radial direction, i.e., in a direction perpendicular to the axis of rotation of the tire. Axial acceleration is the acceleration of the wheel or tire in an axial direction, i.e., along the axis of rotation of the tire, i.e., a door-to-door acceleration. Longitudinal acceleration is the acceleration in the longitudinal direction perpendicular to the axis about which the tire rotates, i.e., from front to back of the vehicle. Temperature and pressure sensors 6 can also be provided. For example, a temperature transducer and a pressure transducer can be provided and operated in the same manner as in the tire monitoring system of SmarTire Systems, Inc. A centrifugal switch, not shown, may also be included so that the system is switched on only when the vehicle is in motion and is switched off or switched into a sleep mode when the vehicle stops, thereby extending battery life.

The accelerometer 2 and accelerometer 4 may be provided as a two-axis accelerometer. Alternatively, a three-axis accelerometer may also be provided such that the longitudinal acceleration is also measured.

The accelerometer 2 and accelerometer 4 (e.g., in the form of a two-axis accelerometer) and any other sensor provided, e.g., the temperature and pressure sensor 6 and the centrifugal switch, transmit their signals to one or more microprocessors, generally designated by the reference numeral 8. At least some, preferably all of the microprocessors 8 are provided on the wheel rim, either inside or outside the tire, and are preferably combined into a single microprocessor. One or more of the sensors can be combined with the microprocessor in a single, custom application specific integrated sensor.

As shown in FIG. 1, the at least one processor 8 has several functions. One microprocessor 10, or one portion of the processor if a single microprocessor is provided, receives the output from the accelerometer 2 and, if provided, accelerometer 4, the temperature and pressure sensors 6 and the centrifugal switch, and provides power to the sensors 2, 4 and 6. Another microprocessor 12, or one portion of the processor 8 if a single processor is provided, is an analog to digital converter to convert the analog signals from the sensors 2, 4 and 6 to digital signals.

Another microprocessor 14, or another portion of the processor 8 if a single processor is used, processes the digitized output of the sensors to determine the tire imbalance, and/or wheel rotational speed, as will be described hereinafter, and makes a decision as to whether or not to transmit an information signal to the driver. If a decision is made by the microprocessor 14 to transmit an information signal to the driver, then microprocessor 16, or one portion of the processor 8 if a single processor is used, transmits the information signal wirelessly from the wheel through radio transmitter 18.

The wireless signal is received by an antenna 20 of a receiver 22 provided onboard the vehicle. The information signal is processed by microprocessor 24 and sent to body control module or information display 26. The information signal can either be a warning signal, with or without an accompanying audio alert or a quantitative data read out showing the relative tire imbalance. In the case of wheel rotational speed, the signal is provided to a vehicle controller, such as an anti-lock braking system or integrated vehicle controller.

The driver information display can be provided either in the dashboard, on the rear view mirror or in an overhead console, as can be appreciated by those skilled in the art.

Figure 2:
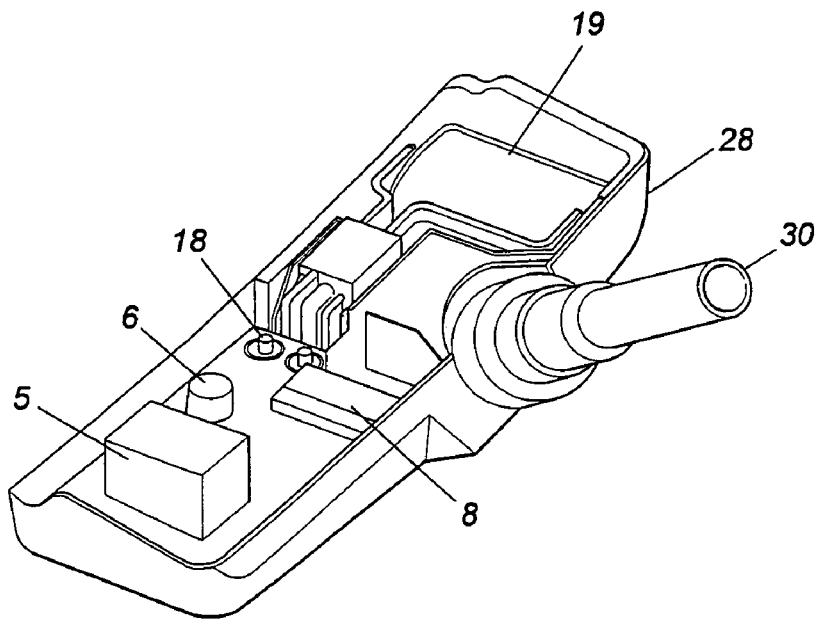
FIG. 2 is a perspective view of an integrated sensor and processor unit that can be used with the technique of the present invention.

FIG. 2 is a schematic perspective drawing showing one embodiment of the wheel mounted portion of the system which is capable of being used in accordance with the technique of the present invention. As shown in FIG. 2, the sensors 2, 4 and 6, as well as the processor 8 and transmitter 18 are provided on the rim, inside the tire. In particular, they are provided inside a casing 28 which can be adjustably mounted around a valve stem 30 of the tire. While the casing 28 is shown as being provided around the valve stem 30 inside the tire, other locations are possible, as would be understood by one of ordinary skill in the art. For example, the sensors and the at least one microprocessor can be provided anywhere on the rim, as long as the sensors are spaced from the axis of rotation of the wheel and are protected from the elements, e.g., in a casing on the rim, outside the tire. The protective casing 28 shown in FIG. 2 can also be provided inside the tire using a band mount for mounting the casing to the rim, without mounting the casing 28 on the valve stem 30.

In the arrangement shown in FIG. 2, the accelerometer 2 and the accelerometer 4 are provided as a two-axis accelerometer 5. The temperature and pressure sensors 6 are also provided in the casing 28. A single, application specific microprocessor 8, having the functions 10, 12, 14 and 16 shown in FIG. 1 is provided in the casing 28, as is transmitter 18. A battery 19 for providing power to the microprocessor 8 and sensors 5 and 6 is also provided. The battery is preferably a lithium battery. The casing 28 and the elements provided therein are virtually maintenance-free. In this regard, while some or all of the microprocessors or microprocessor functions 10, 12, and 14 could be provided onboard the vehicle in microprocessor 24 of receiver 22, it is preferred that the microprocessors or functions 10, 12 and 14 be provided on the wheel unit to conserve battery life. The battery life can be conserved by processing the information to determine the tire tread wear with microprocessor or microprocessor portion 14 and transmitting an information signal only if the tire tread wear significantly changes, e.g., deteriorates beyond an acceptable level. By limiting the number of transmissions in this manner, the battery life can be extended. Of course, as would be understood by one skilled in the art, it is possible to continuously or intermittently transmit the signals from one or more of the sensors 2, 4 and 6 to the receiver 22 and to process the signals with microprocessor 24.

The present invention is based on applicants' findings that the acceleration of the wheel or tire, such as the radial and/or axial acceleration of the wheel or tire, can be used to provide information regarding tire tread wear, shock absorber performance, balance condition and/or wheel rotation speed. In addition, a radial signal frequency is indicative of wheel rotational speed and can be used to provide wheel rotational speed data to a vehicle controller such as an anti-lock braking system or an integrated vehicle controller.

More particularly, in order to monitor tire imbalance, the radial acceleration may be measured by the radial accelerometer 2 or the axial acceleration may be measured by the axial accelerometer 4 or both the radial and axial accelerations may be measured by a two-axis or three-axis accelerometer 5. It has been found that measuring the radial acceleration is effective and for exemplary purposes only the radial acceleration will be used. However, it is to be understood the present invention is not limited to only the radial acceleration.

The measured acceleration signals of then transmitted to the signal processing circuit or microprocessor portion 10 which controls accelerometers 2, 4, or 5 and transmits the signals to analog to digital converter 12. A predetermined number of digitized samples are collected. It has been found that 512 samples are effective. However, the present invention is not limited to this number of samples.

The digital signals are then transmitted to microprocessor or microprocessor portion 14 which calculates a Discrete Fourier Transform (DFT) of the acceleration signals by taking a Fast Fourier Transform (FFT) of the acceleration signals, for example. Each component of the FFT is normalized to the total axial energy collected over a first predetermined frequency range. It has been found that a first predetermined frequency range of from 0 to 50 Hz is effective. However, the present invention is not limited to this frequency range.

The rotational frequency of the collected and normalized result is then used to calculate the rotational frequency of the wheel and the second harmonic of the rotational frequency of the wheel is then calculated.

Then, all of the frequency components are summed around this second harmonic frequency on either the radial or axial accelerometer including a predetermined number of standard deviations on either side of is the second harmonic frequency. It has also been found that the axial accelerometer signal is effective. It has also been found that two standard deviations are effective. However, the present invention is not limited to this value.

Because the tire imbalance can often be easily detected at a higher rotational speed, the output may then either have a speed threshold for 0 weighting, and or be weighted by a power of the fundamental rotational frequency above the threshold and then be low pass filtered to eliminate higher frequency components including spurious noise components.

The power of the fundamental rotational frequency may then be low pass filtered to eliminate higher frequency components including spurious noise components.

The ratio of the above two filtered results is then compared with a predetermined threshold value and upon the predetermined threshold value being exceeded, the driver is warned of the tire imbalance, which usually indicates possible tread separation. Note that it is possible to provide indication to the driver as to the amount of tire trend imbalance rather than only providing a warning signal just prior to tire failure.

In order to monitor wheel rotational speed of a vehicle wheel, the system and method use a sensor 2 which senses at least one acceleration, such as the radial acceleration, of a tire to provide acceleration signals. A transceiver, including, e.g., transmit circuits 16 and a transmitter 18, then transmits a signal indicative of wheel rotational speed to a receiver of a vehicle controller such as an antilock braking system (ABS) or an integrated vehicle controller (IVC). This system can be used to replace the wheel speed sensors currently being used.

If the present invention is incorporated on the vehicle to monitor tire tread wear of a vehicle tire, using the technique of the present invention eliminates the need for the wheel speed sensors currently being used and their associated expense.

The threshold value indicative of no tire imbalance can be measured or calculated. For example, at an OEM assembly plant, for a new car with new tires, at a given wheel/vehicle speed and nominal tire pressure, for each tire, one can take the FFT of various components of acceleration and establish base line signals (both amplitude and frequency) for determining the tire imbalance. The threshold value can be stored in an onboard memory in a microprocessor. While the vehicle is on the road, the technique of the present invention can periodically monitor these signals and calculate the value at a known wheel/vehicle speed and compare the monitored signals with the predetermined threshold value. Significant deviations in these signals can be used to send an alarm. The radial signal frequency can be used as an indication of wheel rotational speed for ABS and IVC applications.

In order to determine the alarm thresholds, a series of calibration tests can be conducted on a standard set of tires over the speed, pressure and tread wear ranges of interest to create a look-up table a priori for each platform. As an alternative to measuring and calibrating every wheel in the factory, it may be sufficient for a given platform with known wheel modules to load in the previously existing calibration data for that set. This look-up table can be encoded in a microprocessor with decision software at the OEM locations. Some of this encoding may be made available for after market users.

Figure 3:
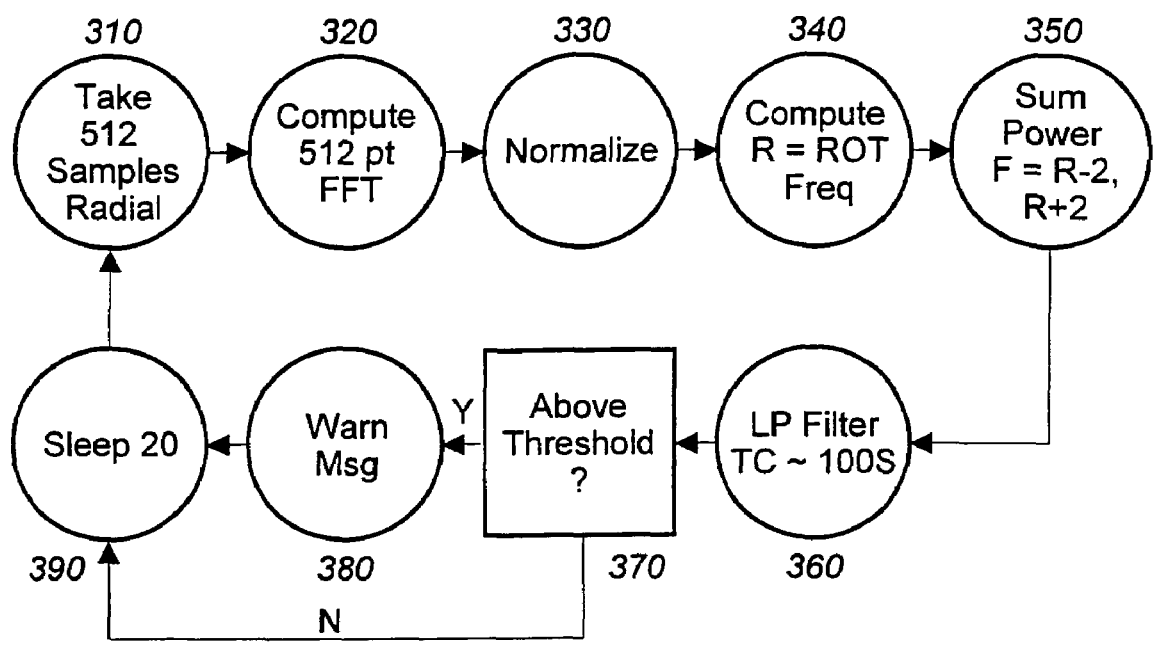
FIG. 3 is a flowchart depicting an example of the steps which may be used to perform the technique for monitoring tire imbalance invention with the present invention.

To summarize, referring to FIG. 3, in step 310, a predetermined number of samples, 512 radial samples, are taken and then digitized and collected. Then, in step 320, the collected samples are then used to compute a transformation, such as an FFT. In step 330, the computed FFT is then normalized and in step 340, the normalized FFT is then used to calculate the rotational frequency of the wheel. In step 350, a predetermined number of samples, 512 axial samples, are taken and digitized and collected. In step 360, the collected samples are then used to compute an FFT. In step 370, the computed FFT is then normalized. In step 380 both the second harmonic signal generated, in step 340, and the axial signal, in step 370, are summed around this second harmonic signal including a predetermined number of standard deviations on either side of the second harmonic frequency. In step 390, the summed signal may be low passed filtered to a time constant of 100 sec, for example, to eliminate spurious noise. In step 400, a determination may be made as to whether the filtered output is a predetermined threshold value above a previously stored baseline value. If it has been determined in step 400 that threshold has been exceeded, a warning message is generated in step 410. Alternatively, if it has been determined in step 400 that the threshold has not been exceeded, then to process moves to step 420 to await the next predetermined interval for again taking samples.

The present invention is based on applicants' findings that the acceleration of the wheel or tire, such as the radial and/or axial acceleration of the wheel or tire, can be used to provide information regarding tire tread wear, shock absorber performance, balance condition and/or wheel rotation speed. In addition, a radial signal frequency is indicative of wheel rotational speed and can be used to provide wheel rotational speed data to a vehicle controller such as an anti-lock braking system or an integrated vehicle controller.

More particularly, referring back to FIG. 1, in order to monitor tire tread wear, the radial acceleration may be measured by the radial accelerometer 2 or the axial acceleration may be measured by the axial accelerometer 4 or, refering back to FIG. 2, both the radial and axial accelerations may be measured by a two-axis or three-axis accelerometer 5. It has been found that measuring the axial acceleration is effective and for exemplary purposes only the axial acceleration will be used. However, it is to be understood the present invention is not limited to only the axial acceleration.

The measured acceleration signals of then transmitted to the signal processing circuit or microprocessor portion 10 which controls accelerometers 2, 4, or 5 and transmits the signals to analog to digital converter 12. A predetermined number of digitized samples are collected. It has been found that 512 samples are effective. However, the present invention is not limited to this number of samples.

The digital signals are then transmitted to microprocessor or microprocessor portion 14 which calculates a Discrete Fourier Transform (DFT) of the acceleration signals by taking a Fast Fourier Transform (FFT) of the acceleration signals, for example. Each component of the FFT is normalized to the total axial energy collected over a first predetermined frequency range. It has been found that a first predetermined frequency range of from 0 to 50 Hz is effective. However, the present invention is not limited to this frequency range.

The average energy within a second predetermined frequency range is stored in a memory device, such as a register, and assigned a corresponding average frequency. It has been found that a second predetermined frequency range of from 30 to 50 Hz which is around the lateral resonance frequency of a tire shell. The equivalent or average frequency from with in this second range is then calculated. A shift in equivalent or average frequency in this second range is indicative of tire wear. However, the present invention is not limited to this frequency range.

The output may then be low pass filtered to eliminate spurious noise components.

The summation of frequency components for new tires is stored and referred to as the baseline value. Periodically, a new set of frequency components is generated and the average frequency value compared with the baseline value. The periodic sampling may be performed on the basis of time intervals or mileage intervals, the mileage being easily determined from the wheel rotation measurement since the mileage is proportional to the number of wheel rotations. Upon the frequency value shifting by a predetermined amount above the baseline frequency value, the driver may be warned that tire failure is probable. Note that it is possible to provide indication to the driver as to the amount of tire trend wear rather than only providing a warning signal just prior to tire failure.

In order to monitor wheel rotational speed of a vehicle wheel, the system and method use a sensor 2 which senses at least one acceleration, such as the radial acceleration, of a tire to provide acceleration signals. A transceiver, including, e.g., transmit circuits 16 and a transmitter 18, then transmits a signal indicative of wheel rotational speed to a receiver of a vehicle controller such as an antilock braking system (ABS) or an integrated vehicle controller (IVC). This system can be used to replace the wheel speed sensors currently being used. If the present invention is incorporated on the vehicle to monitor tire tread wear of a vehicle tire, using the technique of the present invention eliminates the need for the wheel speed sensors currently being used and their associated expense.

The stored values indicative of no tire tread wear can be measured or calculated. For example, at an OEM assembly plant, for a new car with new tires, at a given wheel/vehicle speed and nominal tire pressure, for each tire, one can take the FFT of various components of acceleration and establish base line signals (both amplitude and frequency) for determining the tire tread wear. These base line values can be stored in an onboard memory in a microprocessor. While the vehicle is on the road, the technique of the present invention can periodically monitor these signals and calculate these values at a known wheel/vehicle speed and compare the monitored signals with the base line values. Significant deviations in these signals can be used to send an alarm. The radial signal frequency can be used as an indication of wheel rotational speed for ABS and IVC applications.

In order to determine the alarm thresholds, a series of calibration tests can be conducted on a standard set of tires over the speed, pressure and tread wear ranges of interest to create a look-up table a priori for each platform. As an alternative to measuring and calibrating every wheel in the factory, it may be sufficient for a given platform with known wheel modules to load in the previously existing calibration data for that set. This look-up table can be encoded in a microprocessor with decision software at the OEM locations. Some of this encoding may be made available for after market users.

Figure 4:
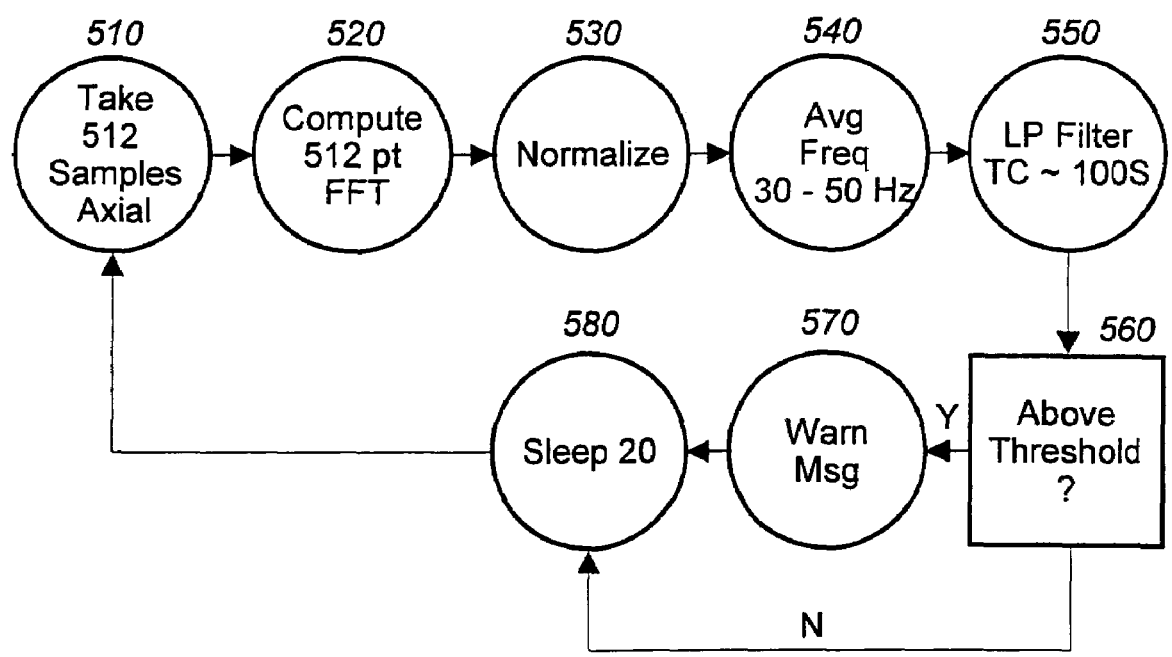
FIG. 4 is a flowchart depicting an example of the steps which may be used to perform the technique for measuring tire tread wear with the present invention.

To summarize, referring to FIG. 4, in step 510, a predetermined number of samples, such as 512 axial samples are taken and then digitized and collected. Then, in step 520, the collected samples are then used to compute a transformation, such as an FFT. In step 530, the computed FFT is then normalized and in step 540, the normalized FFT is then averaged over a predetermined frequency range, such as 30-50 Hz. In step 550, the averaged value may be low pass filtered with a time constant of 100 seconds, for example, to eliminate spurious noise. In step 560, a determination may be made as to whether the filtered output is a predetermined threshold value above a previously stored baseline value. If it has been determined in step 560 that threshold has been exceeded, a warning message is generated in step 570 and the process moves to step 580. Alternatively, if it has been determined in step 560 that the threshold has not been exceeded, then to process moves to step 580 to await the next predetermined interval for again taking samples.

The present invention is based on applicants' findings that the acceleration of the wheel or tire, particularly the radial acceleration of the wheel or tire, can be used to provide information regarding shock absorber performance. Applicants have found that an increase in the radial acceleration signal amplitude in a particular frequency range is indicative of a non-functional or poorly functioning shock absorber. In addition, the radial signal frequency is indicative of wheel rotational speed and can be used to provide wheel rotational speed data to a vehicle controller such as an anti-lock braking system or an integrated vehicle controller. Note that the present invention is not limited to only measuring the radial acceleration of a wheel but rather, the radial, axial, or longitudinal acceleration of the wheel or any combination thereof may be measured so as to provide information regarding shock absorber performance. The radial acceleration of the wheel will be discussed below merely for exemplary purposes.

In order to monitor shock absorber performance of a shock absorber attached to a vehicle wheel, the technique in accordance with the present invention uses a sensor 2 which senses, for example, the radial acceleration of a tire to provide acceleration signals. The signals are provided to the microprocessor or microprocessor portion 10 which controls the accelerometer 2 and transmits the signals to analog to digital converter 12. The digital signals are then transmitted to microprocessor or microprocessor portion 14 which first collects a predetermined number of these samples. It is been found that 512 samples are sufficient. It is of course understood that the present invention is not limited to this number of samples. These samples are then used by the microprocessor portion 14 to generate a Discrete Fourier Transform (DFT) of the acceleration signals, e.g., by taking a Fast Fourier Transform (FFT) of the acceleration signals. Note that the present invention is not limited to the use of a DFT or FFT of the acceleration signals but rather, in the present invention, the collected samples are transformed by a spectral transformation of the discrete data from a time domain to a frequency domain. All of the measured frequency components in a predetermined frequency range, such as 0 to 50 Hz, are then normalized by the microprocessor portion 14 to the total energy contained in the FFT. Note that the predetermined frequency range is dependent upon the specific parameters of the shock absorber, suspension, vehicle wheel, and other components of the vehicle. A predetermined frequency range of 0 to 50 Hz has been found to be effective. However, it is to be understood that the present invention is not limited to this particular frequency range. The microprocessor 14 then calculates a sum of all of the frequency components in another predetermined frequency range, such as 18 to 22 Hz. As above, this particular frequency range is also determined by the characteristics and parameters of the shock absorber, suspension, vehicle wheel, and vehicle parameters. A frequency range of 18 to 22 Hz, which is around the unsprung mass resonance frequency of a vehicle, has been found to be effective. However, as above, it is to be understood that the present invention is not limited to this frequency range. The calculated sum of the frequency components may then be low pass filtered to eliminate spurious noise components. The resultant samples are then compared with a previously stored baseline value and the result of this comparison is indicative of shock absorber performance. Then, this comparison result indicative of shock absorber performance is transmitted by transmit circuits 16 to transmitter 18. The signal is received by antenna 20 of receiver 22, processed by microprocessor 24 and sent to the driver information display 26 as a visual alarm (with or without an audible alarm) and/or quantitative readout.

The stored values indicative of a new shock absorber can be measured or calculated. For example, at an OEM assembly plant, for a new car with new tires and new shock absorbers, at a given wheel/vehicle speed and nominal tire pressure, for each tire, one can take the FFT of radial and lateral components of acceleration and establish base line signals for the radial acceleration signal for determining the performance of the shock absorber. At a given nominal tire pressure, the FFT of the tire pressure signal is determined, as are the peak frequency components and amplitudes. These base line numbers can be stored in an onboard memory in a microprocessor. While the vehicle is on the road, the system and method of the present invention can periodically monitor these signals and calculate these numbers at a known wheel/vehicle speed and compare the monitored signals with the base line numbers. Significant deviations in these signals can be used to send an alarm. For example, a radial signal amplitude increase in a predetermined range is indicative of a non-functional shock absorber. The radial signal frequency can also be used as an indication of wheel rotational speed for ABS and IVC applications. The periodic monitoring of the shock absorber performance may occur at preset time intervals or at preset distance intervals, noting that preset distance intervals can easily be determined since the number of rotations of a wheel is directly proportional to the distance traveled by the vehicle.

In order to determine the alarm thresholds, a series of calibration tests can be conducted on a standard set of tires over the speed, pressure and wear ranges of interest to create a look-up table a priori for each platform. A threshold of 10 dB has been found to be effective. It is of course understood that the present invention is not limited to this threshold.

As an alternative to measuring and calibrating every wheel in the factory to set frequencies, it may be sufficient for a given platform with known wheel modules to load in the previously existing calibration data for that set. This look-up table can be encoded in a microprocessor with decision software at the OEM locations. Some of this encoding may be made available for after market users.

Figure 5:
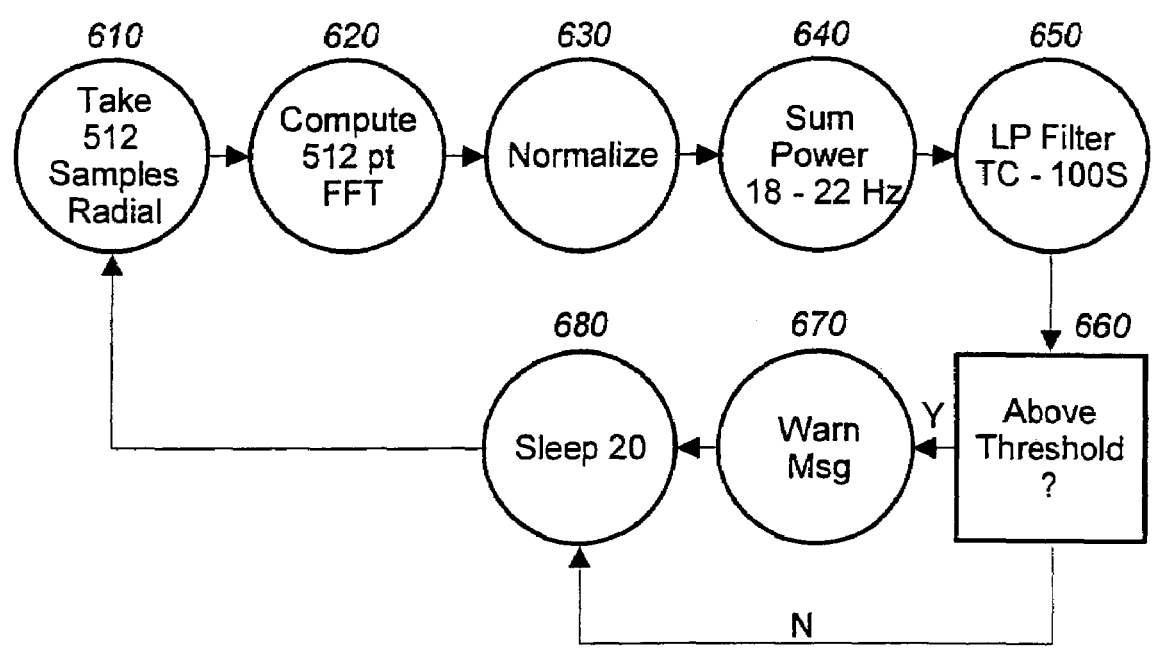
FIG. 5 is a flowchart depicting an example of the steps which may be used to perform the technique for monitoring shock absorber performance with the present invention.

To summarize, referring to FIG. 5, in step 610, a predetermined number of radial samples, such as 512 samples are taken and then digitized and then collected. Then, in step 620, the collected samples are then used to compute a transformation, such as an FFT. In step 630, the computed FFT is then normalized and in step 640 the normalized FFT is then summed over a predetermined frequency range, such as 18-22 Hz, which is around unsprung mass resonance frequency of a vehicle. In step 660, the summed value is low pass filtered with a time constant of 100 seconds, for example, to eliminate spurious noise. In step 670, a determination may be made as to whether the filtered output is a predetermined threshold value above a previously stored baseline value. If it has been determined in step 660 that the threshold has been exceeded, a warning message is generated in step 670 and the process moves to step 680. Alternatively, if it has been determined in step 660 that threshold has not been exceeded, then the process moves to step 680 to await the next predetermined interval for again taking samples.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled the art.

What is claimed is:

1. A method for monitoring shock absorber performance of a shock absorber attached to a vehicle wheel, the method comprising the steps of:
   sensing at least one acceleration of the wheel to provide acceleration signals;
   collecting a predetermined number of acceleration signal samples;
   transforming and normalizing the collected samples within a first predetermined frequency range;
   summing the transformed and normalized samples within a second predetermined frequency range;
   comparing the summed samples with a previously stored baseline value; and
   outputting a signal of the comparison result, the comparison result being indicative of the monitored shock absorber performance.

2. The method of claim 1, wherein sensing at least one acceleration of the wheel comprises sensing at least one of radial, axial, and longitudinal acceleration of the wheel.

3. The method of claim 1, wherein sensing at least one acceleration of the wheel comprises sensing a radial acceleration of the wheel.

4. The method of claim 1, wherein transforming the samples comprises performing a Fast Fourier Transform (FFT) of the samples.

5. The method of claim 1, wherein the first predetermined frequency range is from 0 to 50 Hz.

6. The method of claim 1, wherein the second predetermined frequency range is from 18 to 22 Hz.

7. The method of claim 1, wherein the second predetermined frequency range is a vehicle unsprung mass resonance frequency.

8. The method of claim 1, further comprising low pass filtering the summed samples prior to comparing them with the previously stored baseline value.

9. The method of claim 1, wherein outputting a signal indicative of the comparison result comprises outputting a signal proportional to a difference between the summed samples and the previously stored baseline value.

10. An apparatus for monitoring shock absorber performance of a shock absorber attached to a vehicle wheel, the apparatus comprising:
    a sensor for sensing at least one acceleration of the wheel and for providing acceleration signals corresponding thereto;
    a collector for collecting a predetermined number of acceleration signals samples;
    a transformer and normalizer for transforming and normalizing the samples within a first predetermined frequency range;
    a summer for summing the transformed and normalized samples within a second predetermined frequency range;
    a comparator for comparing the summed samples with a previously stored baseline value; and
    an output circuit for outputting a signal of the comparison result of the comparator, the comparison result being indicative of the monitored shock absorber performance.

11. The apparatus of claim 10, wherein said sensor senses at least one of radial, axial, and longitudinal acceleration of the wheel.

12. The apparatus of claim 10, wherein said sensor senses a radial acceleration of the wheel.

13. The apparatus of claim 10, wherein said transformer performs a Fast Fourier Transform (FFT) of the samples.

14. The apparatus of claim 10, wherein the first predetermined frequency range is from 0 to 50 Hz.

15. The apparatus of claim 10, wherein the second predetermined frequency range is from 18 to 22 Hz.

16. The apparatus of claim 10, wherein the second predetermined frequency range is a vehicle unsprung mass resonance frequency.

17. The apparatus of claim 10, further comprising a low pass filter for low pass filtering the summed samples prior to inputting them to said comparator.

18. The apparatus of claim 10, wherein said signal output by said output circuit comprises a signal proportional to a difference between the summed samples and the previously stored baseline value.

19. The apparatus of claim 10, wherein the previously stored baseline value corresponds to a summed sample value obtained with a new shock absorber.

20. A method of monitoring shock absorber performance comprising:
    sensing and analyzing changes to matched-filtered vibrations of a tire/wheel assembly;
    determining shock absorber performance based on said sensing and analyzing; and
    providing an indication of a non-functional shock absorber based on said determining.

21. An apparatus for monitoring shock absorber performance comprising:
    a sensor to sense vibrations of a tire/wheel assembly;
    a processing device to match filter the sensed vibrations and analyze changes to the matched-filtered vibrations and to determine shock absorber performance based on the sensed changes; and
    a display for providing an indication in response to the determined performance.

* * * * *